United States Patent
DiBella et al.

(10) Patent No.: US 7,727,386 B2
(45) Date of Patent: Jun. 1, 2010

(54) VORAXIAL FILTRATION SYSTEM WITH SELF-CLEANING AUXILIARY FILTRATION APPARATUS

(76) Inventors: Alberto DiBella, 3500 Bayview Dr., Ft. Lauderdale, FL (US) 33308; Michael Anthony, 10189 W. Sample Rd., Coral Springs, FL (US) 33365

( * ) Notice: Subject to any disclaimer, the term of this patent is extended or adjusted under 35 U.S.C. 154(b) by 826 days.

(21) Appl. No.: 10/719,825

(22) Filed: Nov. 21, 2003

(65) Prior Publication Data

US 2005/0109684 A1    May 26, 2005

(51) Int. Cl.
*B01D 36/00*    (2006.01)
(52) U.S. Cl. .................. 210/85; 210/96.1; 210/259; 210/413; 210/414; 210/512.1
(58) Field of Classification Search ............. 210/85, 210/96.1, 107, 108, 411, 413, 415, 497.01, 210/512.1, 739, 745, 787, 789, 414, 259, 210/741, 791; 494/1, 7, 10, 25, 26, 53, 74, 494/79
See application file for complete search history.

(56) References Cited

U.S. PATENT DOCUMENTS

| | | | | |
|---|---|---|---|---|
| 3,517,821 | A | * | 6/1970 | Keller et al. ............. 210/512.1 |
| 3,743,102 | A | * | 7/1973 | Mensing et al. .......... 210/512.1 |
| 3,907,686 | A | * | 9/1975 | Fletcher et al. ............. 210/259 |
| 4,297,209 | A | * | 10/1981 | DeVisser et al. ............. 210/107 |
| 4,369,915 | A | * | 1/1983 | Oberg et al. .................... 494/8 |
| 4,478,712 | A | * | 10/1984 | Arnaudeau ................. 210/96.1 |
| 4,778,443 | A | * | 10/1988 | Sands et al. .................... 494/31 |
| 4,904,392 | A | * | 2/1990 | Dahlquist .................... 210/708 |
| 5,044,755 | A | * | 9/1991 | Landa et al. ................. 356/440 |
| 5,084,189 | A | * | 1/1992 | Richter ........................ 210/789 |
| 5,156,751 | A | * | 10/1992 | Miller .......................... 210/787 |
| 5,472,604 | A | * | 12/1995 | Yang ........................... 210/409 |
| 5,484,521 | A | * | 1/1996 | Kramer ........................ 210/86 |
| 5,489,980 | A | * | 2/1996 | Anthony ...................... 356/308 |
| 5,490,924 | A | * | 2/1996 | Macia et al. ............. 210/257.1 |
| 5,632,903 | A | * | 5/1997 | Caracciolo, Jr. ............. 210/741 |
| 5,840,006 | A | * | 11/1998 | Leung et al. ................... 494/53 |
| 5,904,840 | A | | 5/1999 | DiBella |
| 5,948,271 | A | * | 9/1999 | Wardwell et al. ............ 210/739 |
| 6,248,231 | B1 | * | 6/2001 | Di Bella et al. ............... 210/85 |
| 6,752,920 | B2 | * | 6/2004 | Harris et al. ................. 210/107 |

* cited by examiner

*Primary Examiner*—Joseph W Drodge
(74) *Attorney, Agent, or Firm*—Oltman, Flynn & Kubler

(57) ABSTRACT

A voraxial separation system having an auxiliary filter is disclosed for separating flowable composite media into components. The voraxial separation system receives a flowing stream of composite media and utilizes centrifugal force to separate the stream into component radial layers according to specific gravity whereafter one or more radial layers may be extracted from the stream. An auxiliary filtration apparatus includes a conduit having a flowable media input, a generally cylindrical filter disposed within the conduit, and filtered and unfiltered media outlets. An elongate spray tube is disposed within the tubular filter substantially adjacent to the radially inner surface of the filter. The spray tube is fluidly connected to a pressurized fluid source and defines a plurality of spray outlets disposed in a direction radially outward so as to direct pressurized fluid onto the cylindrical filter from the filter interior thereof to clean the filter of accumulated substances. A rotational drive system provides powered rotation of the spray tube, and a spectrophotometer assembly monitors the accumulation of component medium on the filter and adjusts rotation speed of the spray tube in response to filter loading.

2 Claims, 17 Drawing Sheets

VORAXIAL FILTRATION SYSTEM WITH SELF-CLEANING AUXILIARY FILTRATION APPARATUS

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights.

BACKGROUND OF THE INVENTION

1. Field of the Invention

The present invention relates to systems for separating flowing substances, including fluids and solids, by means of centrifugal separation, and more particularly to a voraxial filter system adapted with a self-cleaning filter apparatus for providing auxiliary upstream and/or downstream filtration and separation of substances.

2. Description of the Background Art

Cyclone or centrifugal separators have been used in many applications to separate one fluid form another on the basis of specific gravity, whether or not those substances are of the same or different physical states and particularly for the separation of light liquids from heavy liquids and gases from liquids. In addition, centrifugal separators have been adapted to separate solids of varying densities and/or solids from fluids.

An inventor of the present invention has contributed to advancements in the art of centrifugal separation of miscible and immiscible media, as disclosed in U.S. Pat. No. 5,904,840, issued to DiBella on May 18, 1999, which disclosure is incorporated herein as part of this disclosure by reference. An inventor of the present invention has also contributed to determining the identity and concentration of substances in a multi-component medium by measuring the spectral response of fluid media as disclosed in U.S. Pat. No. 5,489,980, issued to Anthony on Aug. 3, 1991, which disclosure is incorporated herein as part of this disclosure by reference. As disclosed in the '840 patent, the combined teachings provide a voraxial separation system that includes pump means delivering a continuously flowing column of the media from a media source, a separation tube through which a column of the flowing media is continuously passed, means for spinning the column about the axis of the tube at sufficient speed that centrifugal force within the column causes the component media to separate into radial layers, extraction conduit means for selectively extracting one or more of the radial layers from the tube, bleeder means for introducing a fluid such as air into the tube to alter the diameter of the radial layers, and a probe and spectrophotometer which provides monitoring and automatic feed back means for measuring the component medium content as the media enters and exits the separation tube and for adjusting the rotational speed of the media and the rate of fluid introduction from the bleeder means. An alternative to the bleeder means is provided in the form of a mechanism for altering the diameter of the extraction conduit means.

With virtually any type of centrifugal separation apparatus, however, a potential exists for relatively small quantities of substances to remain entrained in the flow and pass through the separation apparatus. As a result, attempts have been made to improve the separation efficiency of such systems by addition of additional stages of centrifugal separation and/or by the addition of non-centrifugal filtration means. These attempts, however, have met with limited success. It has been found that certain substances are not adequately separated by additional stages of centrifugal separation devices. It has also been found that downstream filters are susceptible to clogging, thereby requiring time consuming maintenance and cleaning.

It is thus an object of the present invention to provide a flowable media voraxial separation system which separates one or more fluids and/or solids of different specific gravities and/or densities by centrifugal separation means wherein separation efficiency is increased by use of a self-cleaning filter system specifically adapted for capturing one or more substances and releasing captured substances in response to filter loading.

It is another object of the present invention to provide such a voraxial system wherein the non-centrifugal filter is adapted so as to be self-cleaning.

Still another object of the present invention is to provide such a voraxial system wherein filter-cleaning cycles are periodically or continuously controlled in response to filter loading.

Yet another object of the present invention is to provide a self-cleaning tubular filter having a radially inner rotating spray tube that functions to clean the tubular filter by selective application of a pressurized fluid.

Still another object of the present invention is to provide a self-cleaning tubular filter having a radially inner rotating spray tube which functions to clean the tubular filter by selective application of a pressurized fluid wherein the pressurized fluid may comprise a pressurized gas or a pressurized liquid.

Yet another object of the present invention is to provide a self cleaning tubular filter having a radially inner rotating spray tube which functions to clean the tubular filter wherein the spray tube rotates at sufficient revolutions per minute so as to create a vortex within the tubular filter to effect finer separation of substances.

Still further objects and advantages will become apparent from a consideration of the ensuing description and drawings.

BRIEF SUMMARY OF THE INVENTION

The present invention accomplishes the objectives set forth above, as well as others, as may be determined by a fair reading and interpretation of the entire specification by one of ordinary skill in the art.

A voraxial separation system is disclosed having: (1) a pump means delivering a continuously flowing column of the media from a media source; (2) a separation tube through which a column of the flowing media is continuously passed such that the column is caused to spin about the axis of the tube at sufficient speed that centrifugal force within the column causes the component media to separate into radial layers; (3) extraction conduit means for selectively extracting one or more of the radial layers from the tube; (4) an optional bleeder means for introducing a fluid such as air into the tube to alter the diameter of the radial layers; (5) a probe and spectrophotometer which provides monitoring and automatic feed back means for measuring the component medium content as the media enters and exits the separation tube and for adjusting the rotational speed of the media and the rate of fluid introduction from the bleeder means; and (6) an auxiliary filtration apparatus having a generally cylindrical filter and a rotational inner spray tube connected to a source of pressurized fluid and an electronic control system for controlling the rate of rotation of the inner spray tube in response to the filter loading rate.

The auxiliary filtration apparatus includes a conduit having a primary flowable media input, a generally hollow cylindrical filter defining an apertured filtering surface disposed within the conduit wherein the exterior of the cylindrical filter comprises an upstream filter inlet and the interior of the cylindrical filter comprises a downstream filter outlet, and a primary flowable media outlet in fluid communication with the filter interior. An elongate spray tube is disposed within the tubular filter substantially adjacent to the radially inner surface of the filter. The spray tube is fluidly connected to a pressurized fluid source and defines a plurality of spray outlets disposed in a direction radially outward so as to direct pressurized fluid onto the cylindrical filter from the filter interior thereof to clean the filter of accumulated substances. The spray tube is configured with a rotational drive system for automatic and selective powered concentric rotation about the inner circumferential wall of the filter. The filter apparatus further preferably includes a spectrophotometer assembly that monitors the accumulation of substances on the filter and adjusts rotation speed of the spray tube in response to filter loading.

The auxiliary filtration system disclosed herein is preferably used in conjunction with a primary voraxial separation system, in upstream, intermediate, and/or downstream configurations to provide more efficient separation of flowable composite media. As should be apparent, however, the auxiliary filtration system may be used as a primary self-cleaning filtering system for a wide variety of applications.

BRIEF DESCRIPTION OF THE SEVERAL VIEWS OF THE DRAWINGS

Various other objects, advantages, and features of the invention will become apparent to those skilled in the art form the following discussion taken in conjunction with the following drawings, in which.

DETAILED DESCRIPTION OF THE INVENTION

With reference now to the drawings, FIGS. 1-17 depict a voraxial filter system adapted with a self-cleaning auxiliary filter, which system is adapted to separate one fluid form another on the basis of specific gravity, whether or not those substances are of the same or different physical states and particularly for the separation of light liquids from heavy liquids and gases from liquids. In addition, the voraxial separation system adapted with an auxiliary self-cleaning filter of the present invention is suitable for use in separating solids of varying densities and/or solids from fluids.

Voraxial Separator

FIGS. 1-5 depict a voraxial separation system and auxiliary filter according to a preferred embodiment of the present invention, generally referenced as 10. System 10 includes a voraxial separator 12 having an inlet 14 in fluid communication with a pressurized source of flowable media. Voraxial separator 12 comprises a device that relies on centrifugal forces to separate a flowable media into its components. An example of such a device is disclosed in U.S. Pat. No. 5,904,840, issued to DiBella, which disclosure is incorporated herein by reference. Voraxial separator 12 includes an extraction outlet 16 for selectively extracting one or more radial layers formed by centrifugal force as the flowable media is caused to spin by internal vanes in separator 12. Voraxial separator 12 further includes an outlet 18. Voraxial separator 12 may further include a bleeder means for introducing a fluid such as air into the tube to alter the diameter of the radial layers, and a probe and spectrophotometer which provides monitoring and automatic feed back means for measuring the component medium content as the media enters and exits the separation tube and for adjusting the rotational speed of the media and the rate of fluid introduction from the bleeder means.

Auxiliary Filter

Figure 1:
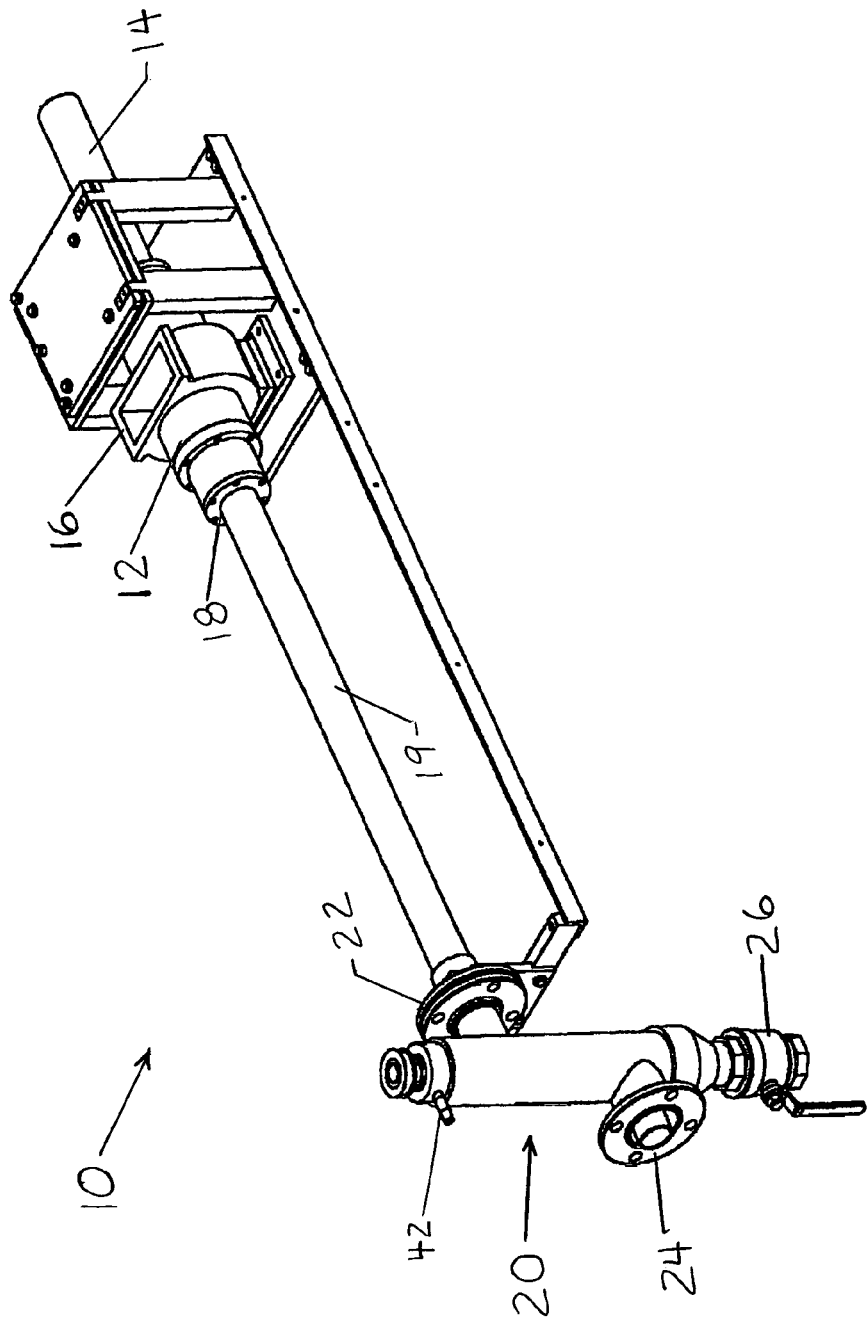
FIG. 1 is a perspective view of a voraxial separator having an auxiliary self-cleaning filter (without rotational drive) connected downstream according to a preferred embodiment of the present invention.
Figure 2:
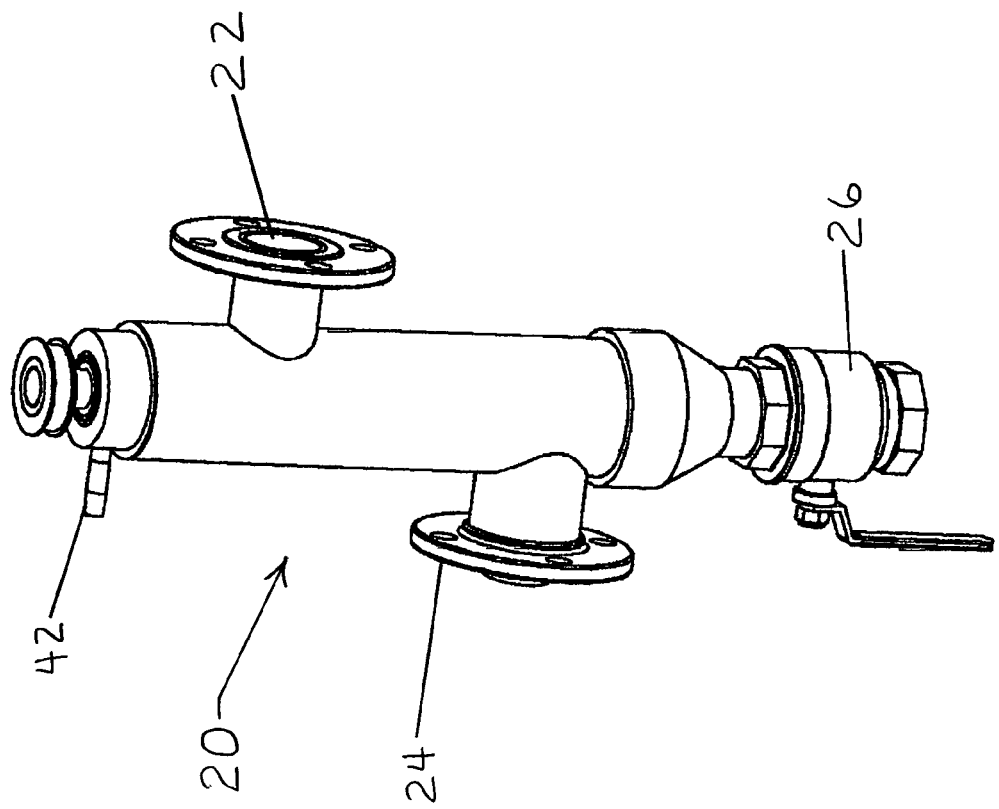
FIG. 2 is a perspective view of the self-cleaning filter.
Figure 3:
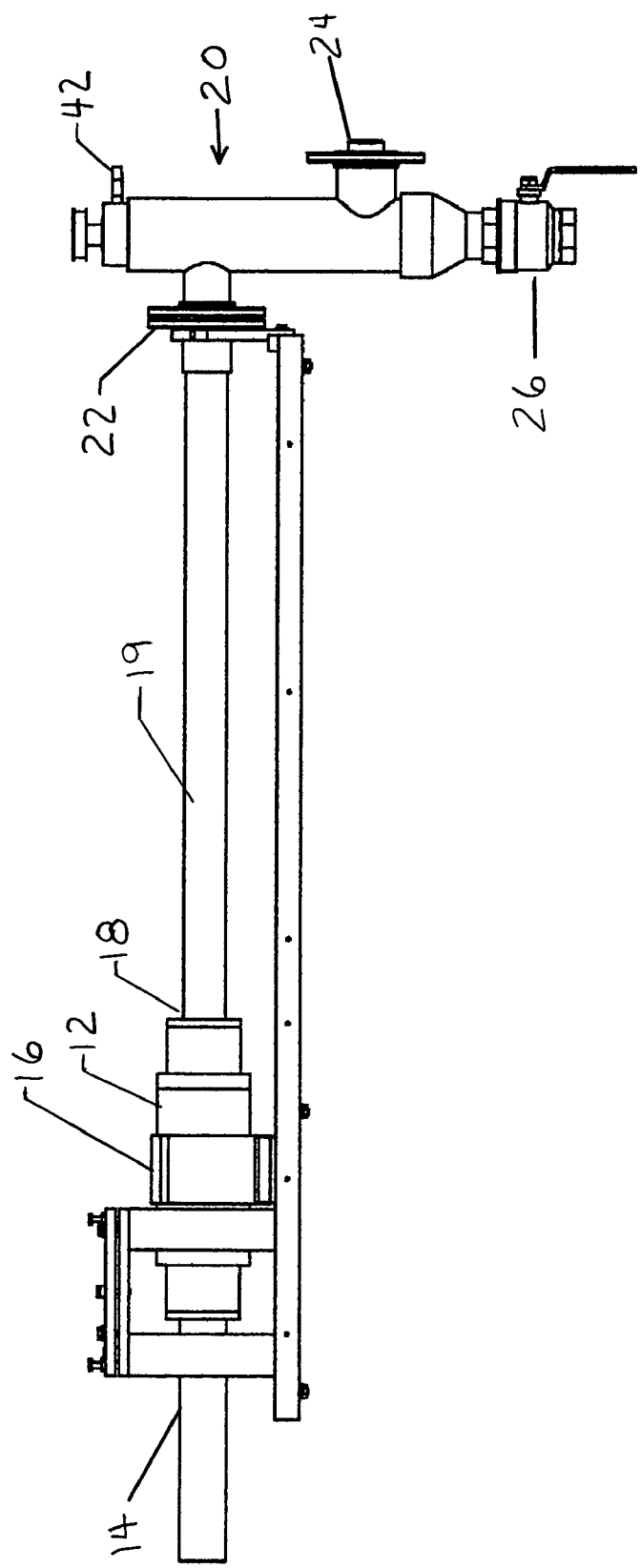
FIG. 3 is a side view of the voraxial separator and self-cleaning filter depicted in FIG. 1.

A significant aspect of the present invention involves use of an auxiliary filter, generally referenced as 20, to increase the efficiency of voraxial separator 12. More particularly, the present invention contemplates use of a self-cleaning filter apparatus 20 having an outer cylindrical housing 21 including an inlet 22, and first and second outlets, referenced as 24 and 26 respectively. Inlet 22 is in fluid communication with the outlet 18 of voraxial separator 12 by a conduit 19 as best depicted in FIG. 1. First outlet 24 is configured downstream of an internal filter contained within apparatus 20, and hence may be referred to as a filtered outlet. Second outlet 26 is configured to accept flow that bypasses the internal filter contained within apparatus 20, and hence may be referred to as a bypass outlet.

Figure 4:
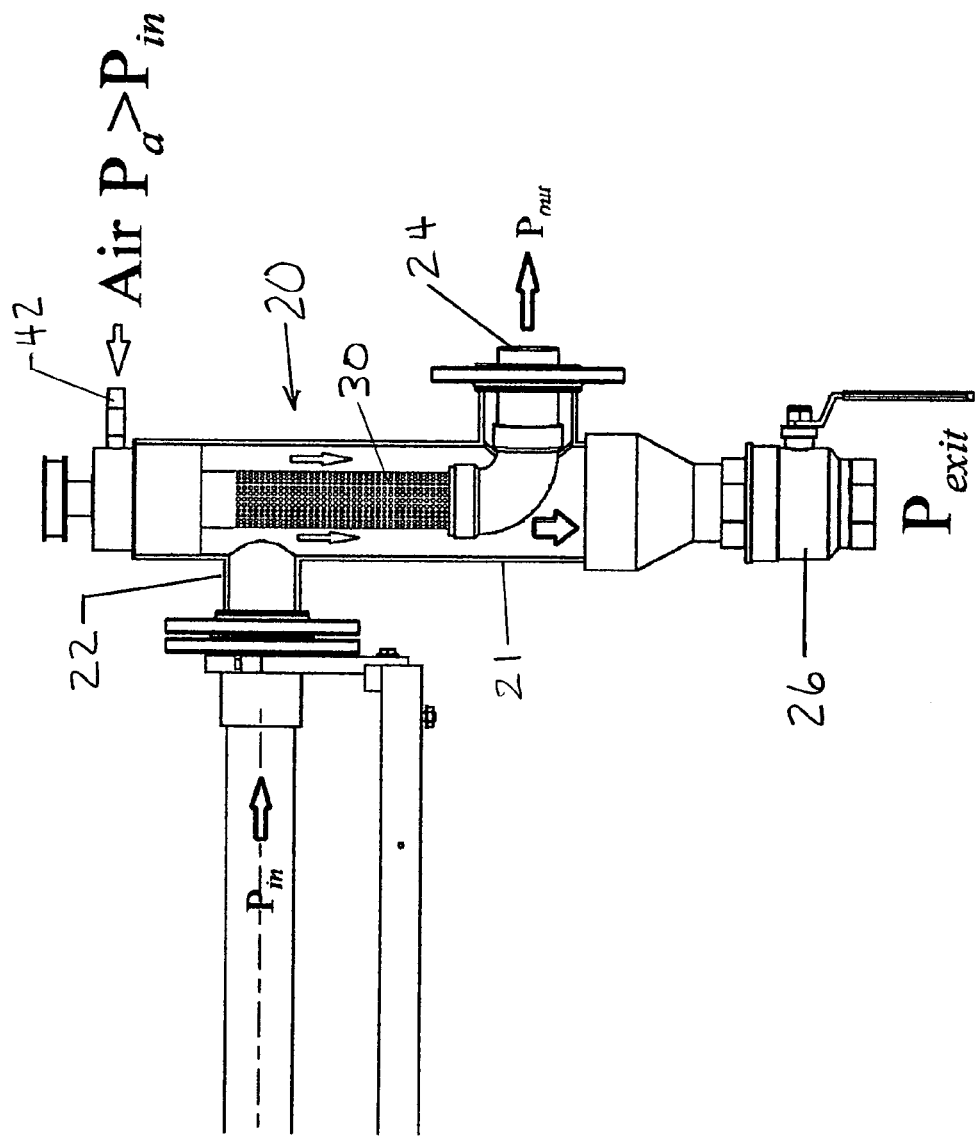
FIG. 4 is a partial sectional view thereof detailing the auxiliary filter.
Figure 5:
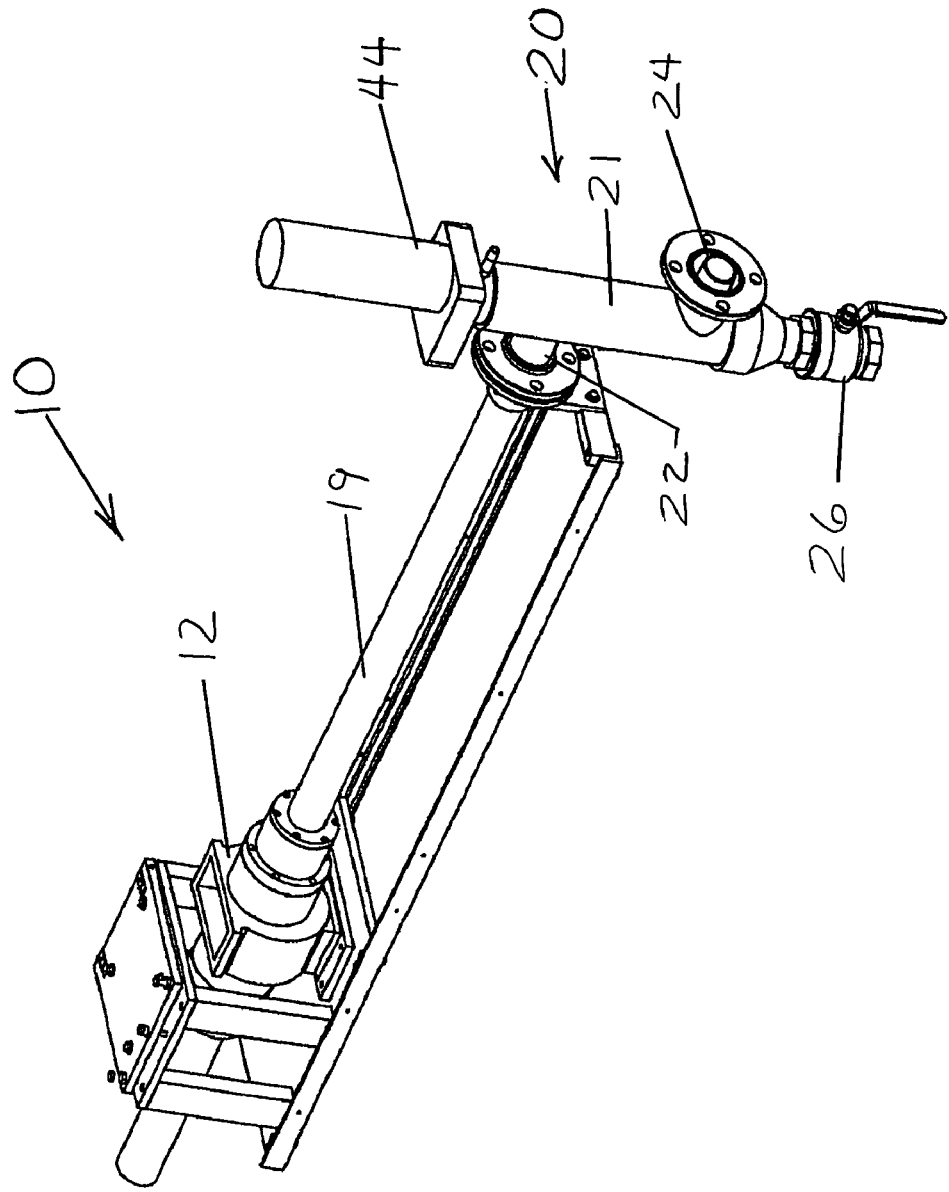
FIG. 5 a perspective view of a voraxial separator having a self-cleaning filter (with rotational drive) connected downstream according to a preferred embodiment of the present invention.
Figure 6:
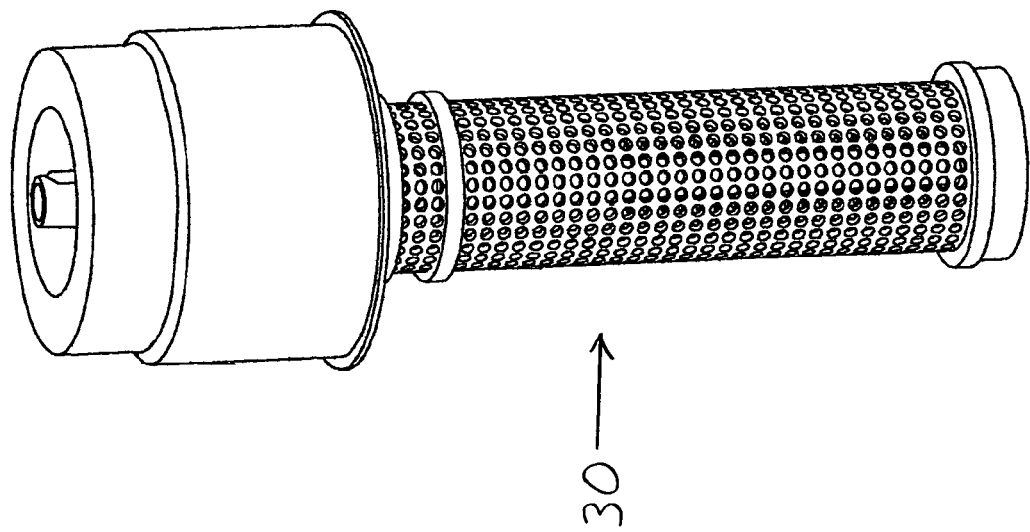
FIG. 6 is a perspective view of the cylindrical filter for use with an auxiliary filter according to the present invention.
Figure 7:
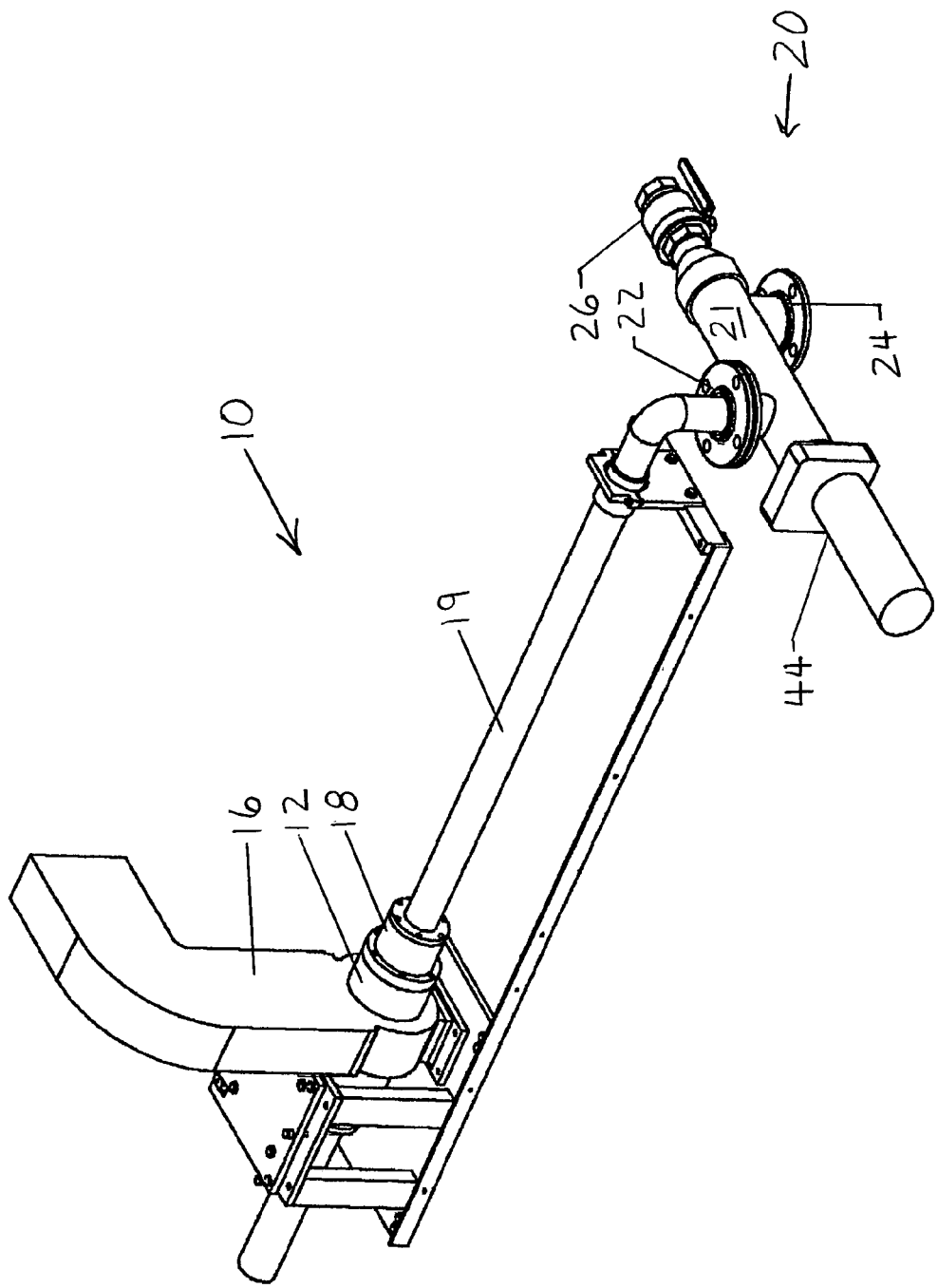
FIG. 7 is a perspective view of an alternate configuration of a voraxial separator having an auxiliary self-cleaning filter connected downstream.
Figure 8:
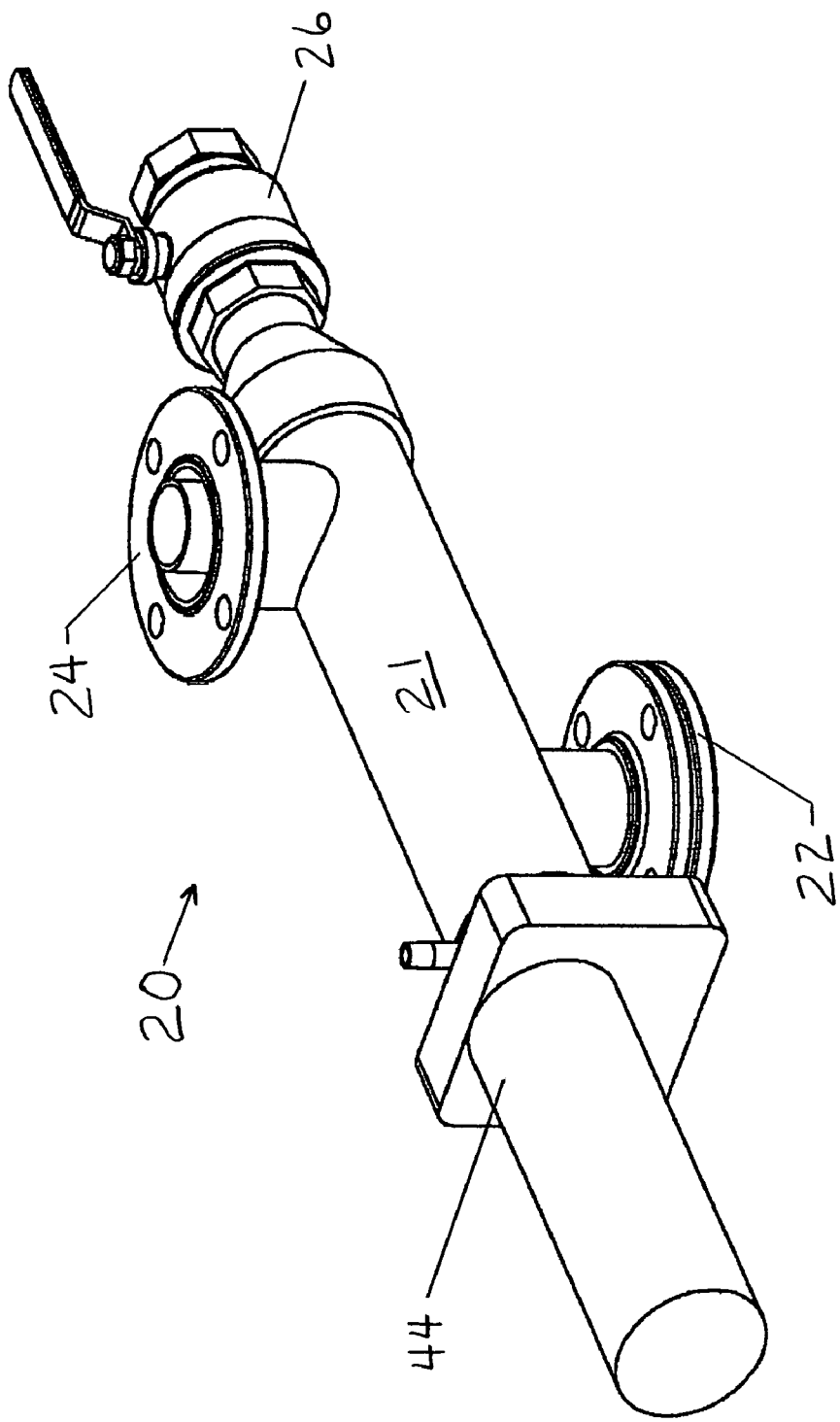
FIG. 8 is a perspective view of a self-cleaning filter according to the present invention.

FIG. 4 depicts a sectional view of filter apparatus 20 and more clearly depicts housing 21, inlet 22, filtered outlet 24, and bypass outlet 26. As illustrated therein, a pressurized flowable media enters filter apparatus 20 via inlet 22. Filter apparatus 20 includes an internal cylindrical filter 30 having a wall defining a plurality of apertures. FIG. 6 provides a detail view of cylindrical filter 30, which generally comprises a cylindrical body having a sidewall defining a plurality of apertures for allowing substances having dimensions smaller than said apertures to pass therethrough. In an alternate embodiment, cylindrical filter 30 may comprise a mesh filter, or any other suitable filter structure. Referring back to FIG. 4, the flowable media that enters inlet 22, or portions thereof, passes through the apertures in cylindrical filter 30 and exits filter apparatus 20 via filtered outlet 24, which is in fluid communication with the interior of cylindrical filter 30 via an elbow conduit 32. Bypass outlet 26 is provided to selective discharge of material captured by filter cylindrical filter 30 as described more fully herein.

Figure 12:
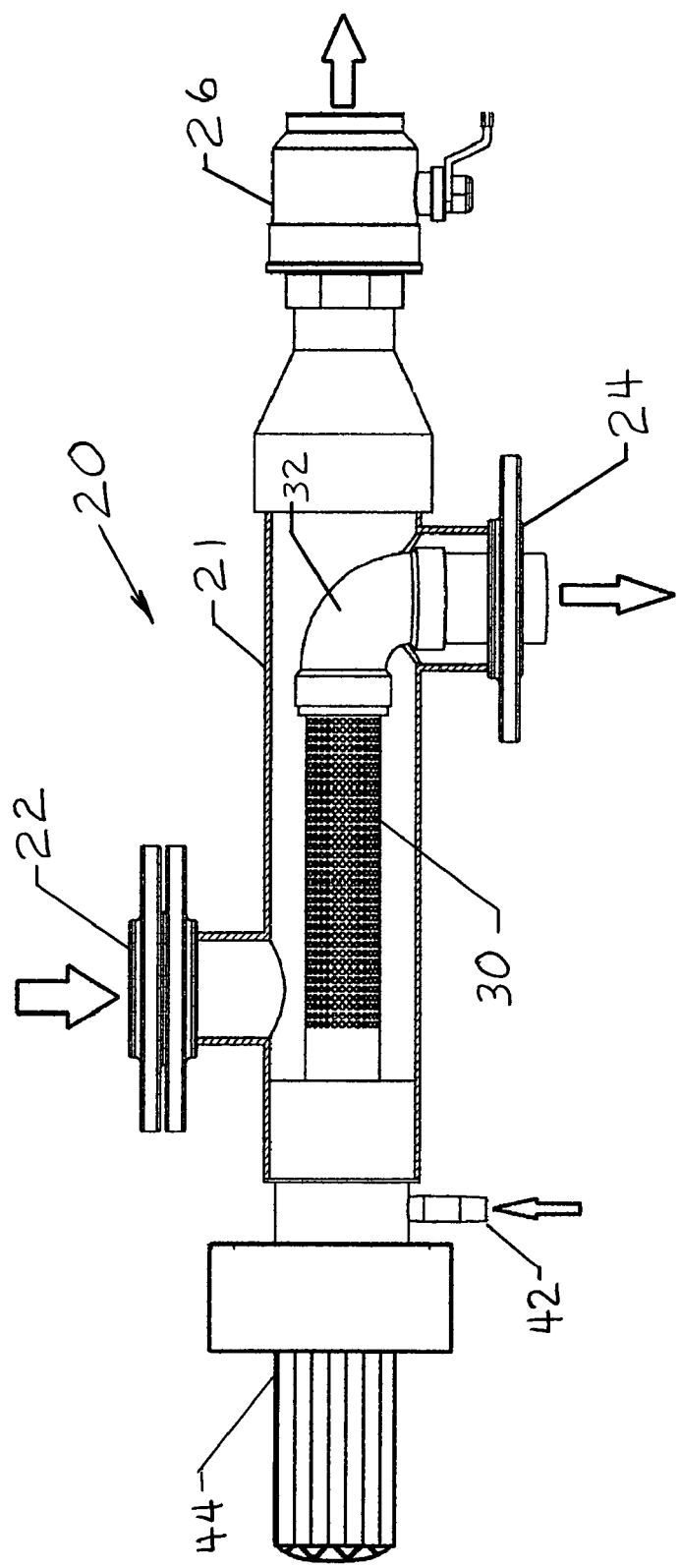
FIG. 12 is a sectional view thereof.
Figure 13:
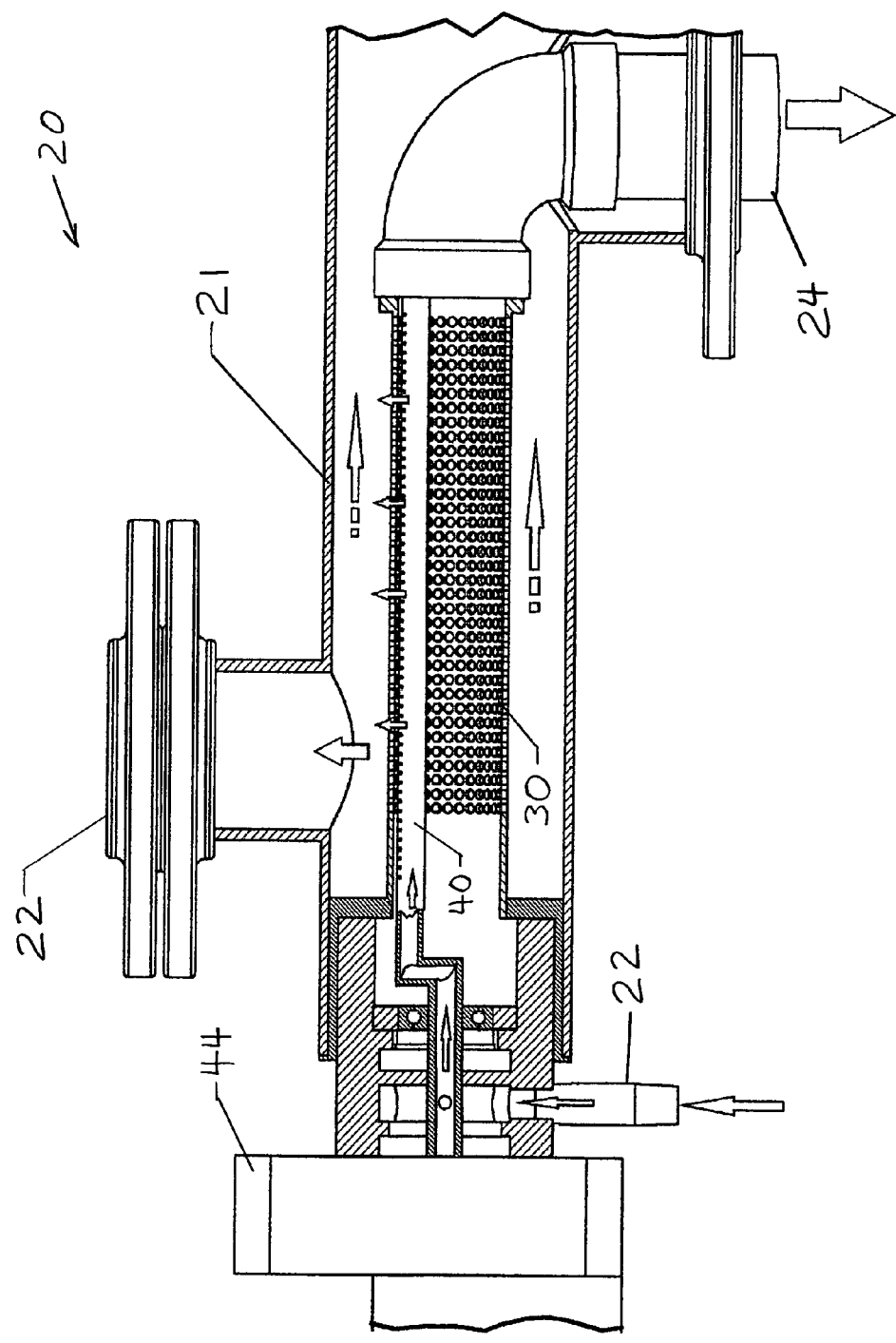
FIG. 13 is a detailed sectional view thereof.
Figure 14:
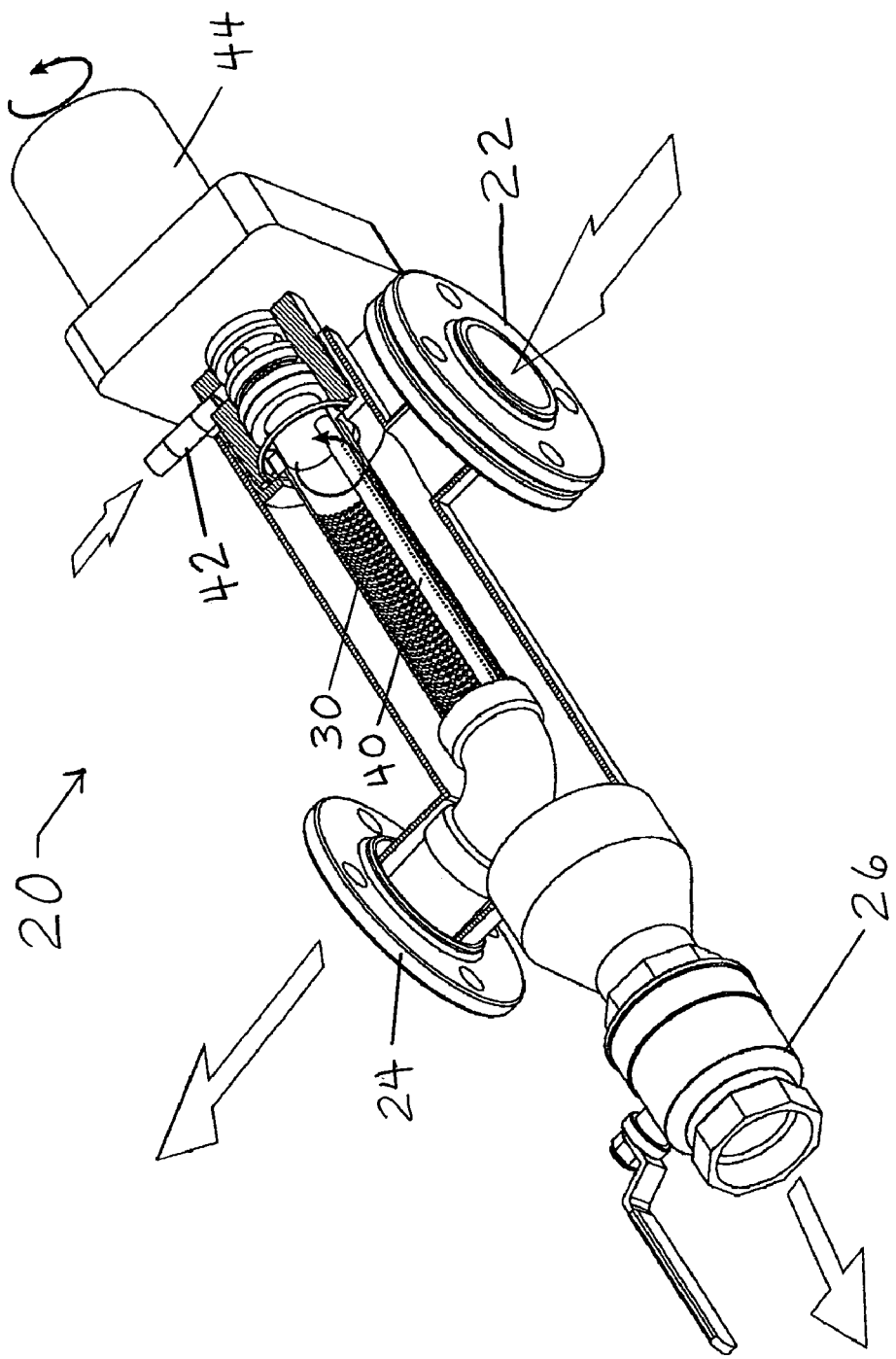
FIG. 14 is a perspective view in partial section illustrating inlet and outlet flow paths.

As noted herein, filter apparatus 20 is self-cleaning. Turning now to FIGS. 12 and 13, filter apparatus 20 is depicted in sectional views wherein the self-cleaning features are best illustrated. FIG. 12 depicts a sectional view of filter housing 21 clearly revealing cylindrical filter 30 axially disposed within filter housing 21 such that the interior of cylindrical filter 30, the filtered downstream side, is in fluid communication with outlet 24 via conduit 32. FIG. 13 depicts a sectional view of filter housing 21 clearly revealing a sectional view of cylindrical filter 30 so as to reveal an interior spray tube, referenced as 40, which functions to automatically and periodically clean filter 30. Spray tube 40 comprises an elongate tubular structure having a plurality of spray apertures oriented so as to direct a spray of pressurized fluid radially outward onto filter 30 from the interior thereof. To accomplish this, spray tube 40 is in fluid communication with a source of pressurized fluid, such as water, air, or any other suitable fluid, via a pressurized fluid inlet 42. As best depicted in FIG. 4, the pressure of fluid entering inlet 42 is preferably greater than the pressure of the flowable media entering inlet 22. In addition, spray tube 40 is connected to a rotational drive system, referenced as 44, which functions to selectively rotate spray tube 40 so as to direct a spray of pressurized fluid radially outward onto the interior surface of cylindrical filter 30 so as to dislodge substances collecting on filter 30. Rotational drive system 44 may comprise an electrically powered motor, such as a stepper motor, or any other suitable electric, pneumatic, or hydraulic motor and/or other power source. As should be apparent, directing a spray of pressurized fluid onto cylindrical filter 30 from the interior thereof causes dislodged substances to become entrained in media flow exiting filter apparatus outlet 26, which dislodged substances and media flow may be either disposed of or run through an additional filtration stage. Conversely, portions of the flowable media that flow through filter 30, i.e. filtered flow, is allowed to exit filter apparatus 20 via filtered outlet 24.

Figure 9:
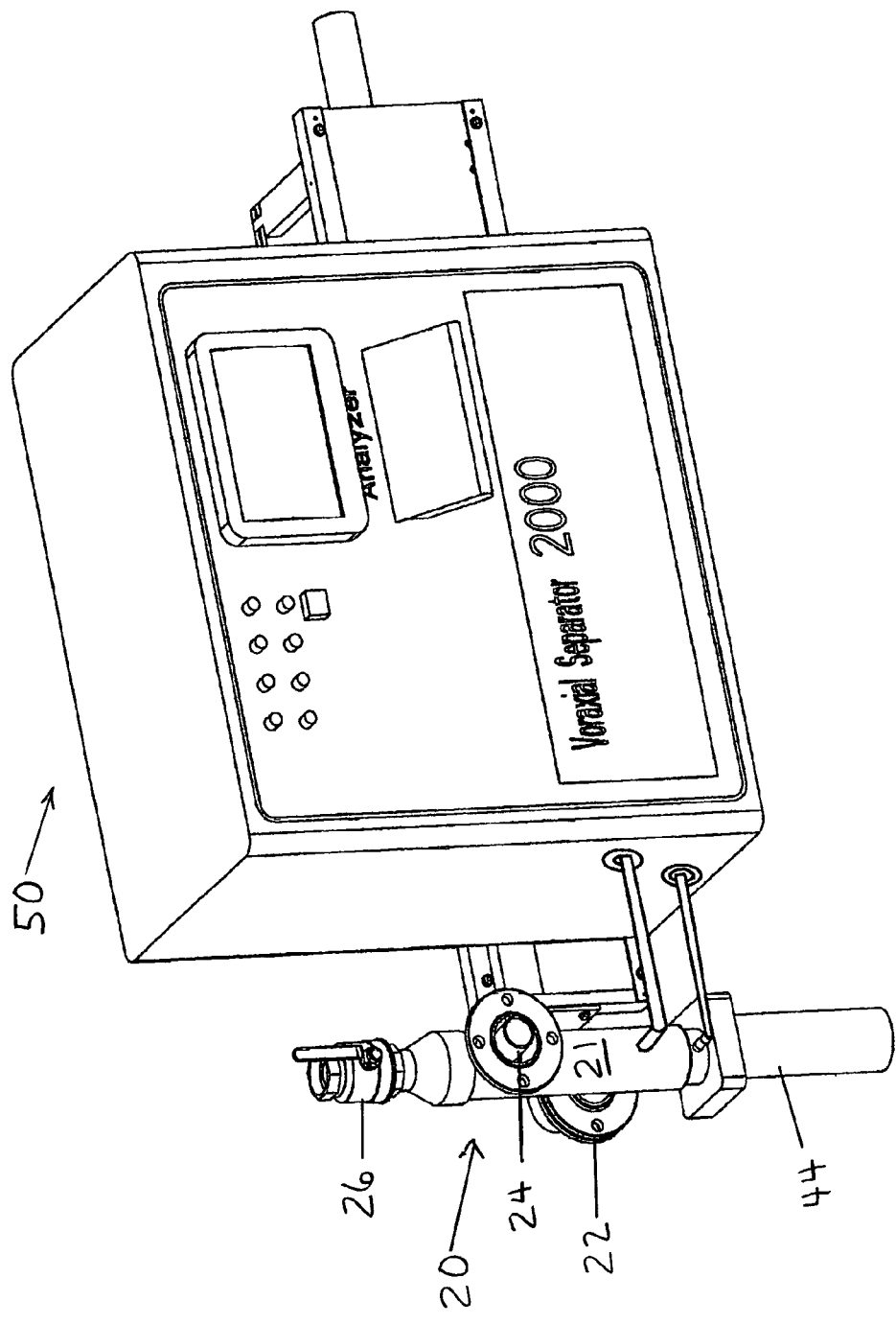
FIG. 9 illustrates a spectrophotometer assembly that monitors the accumulation of substances on the filter and adjusts rotation speed of the spray tube in response to filter loading.
Figure 10:
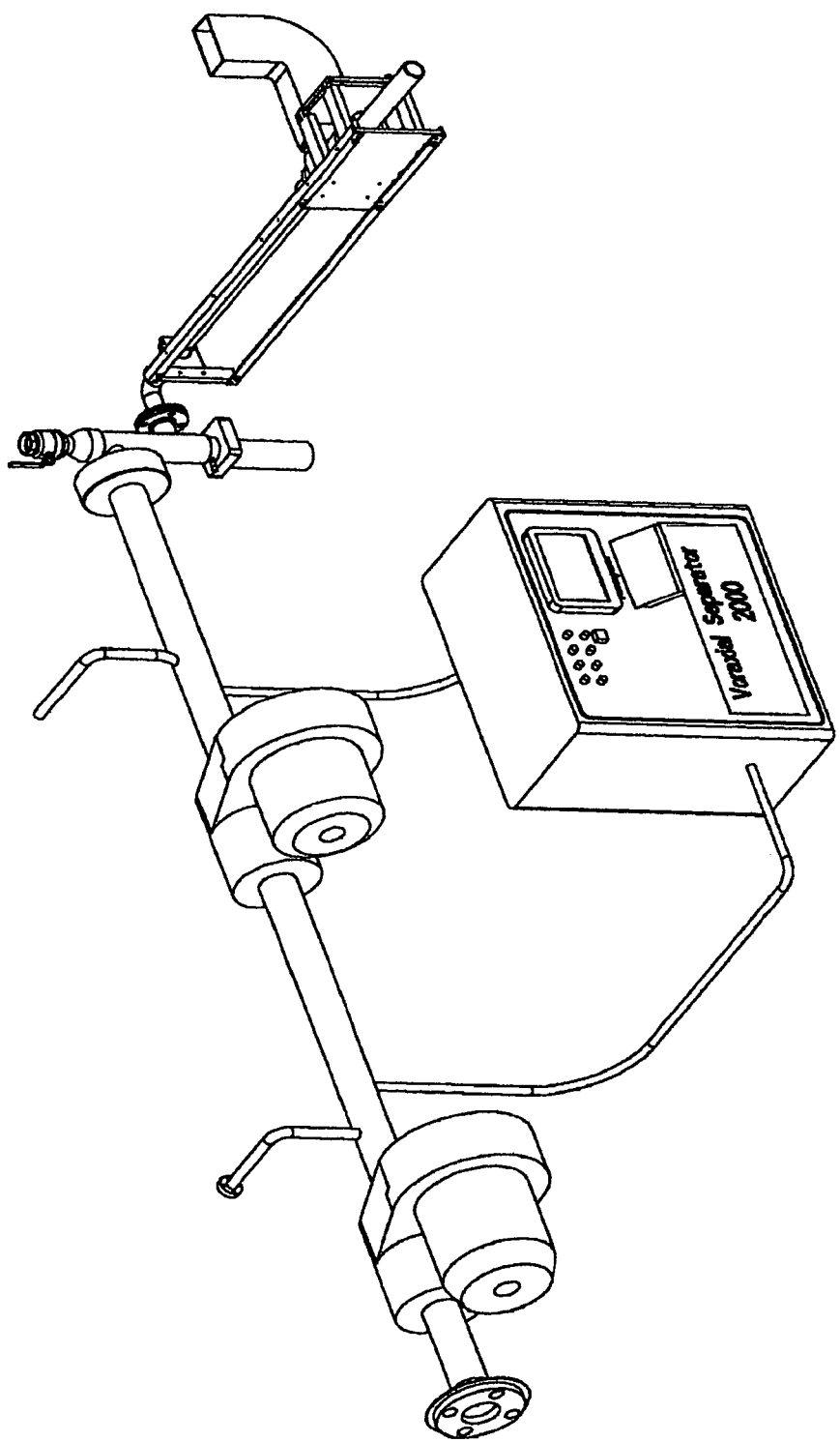
FIG. 10 illustrates an auxiliary filter configured as a second stage filtration unit in a system having three voraxial filters.
Figure 11:
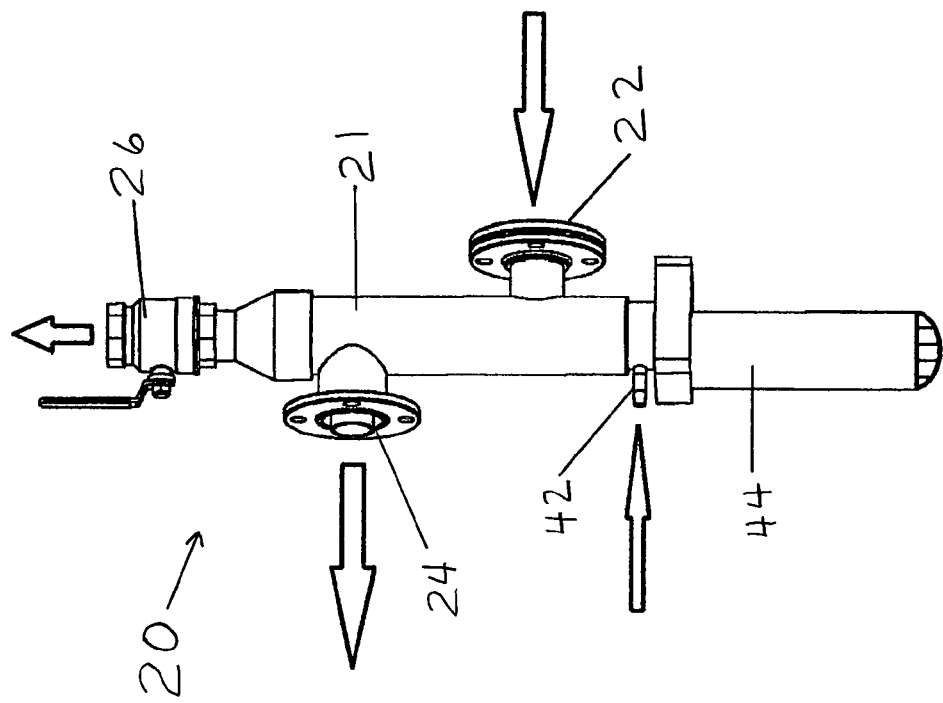
FIG. 11 illustrates inlet and outlet flow paths for an auxiliary filter according to the present invention.

Filter apparatus 20, and rotational drive 44, further preferably include sensing apparatus and feedback control circuitry for sensing particle and/or substance concentration rate on filter 30. FIG. 9 illustrates a sensing and control apparatus, generally referenced as 50, electrically connected to filter apparatus 20 and rotational drive 44 for sensing particle and/or substance concentration rate on filter 30 and controlling rotational drive 44 in response thereto. A suitable system for determining concentration of substances on filter 30 may rely on measuring the spectral response of the fluid media as disclosed in U.S. Pat. No. 5,489,980, issued to Anthony on Aug. 3, 1991, which disclosure is incorporated herein as part of this disclosure by reference. In alternate embodiments, systems that rely on pressure drop across filter 30, flow rates through the filter, or any other suitable system for determining the rate at which filter 30 is loaded may prove suitable for sensing substance concentration and controlling rotational drive 44. FIG. 10 illustrates an auxiliary filter 20 configured as a second stage filtration unit in a system having three voraxial filters.

In a preferred embodiment, depicted in FIG. 9, sensing and control apparatus 50 includes a probe 52 installed in conduit 21 of filter apparatus 20 in a configuration wherein probe 52 is positioned to send/receive photo-scanning signals to/from filter 30. Probe 52 is electrically connected to sensing and control apparatus 50 by low voltage electrical conductors 54. In addition, control apparatus 50 includes a spectrophotometer for monitoring data received from probe 52 and measuring the component medium content accumulated on filter 30. Control apparatus 50 is further adapted for activating rotational drive 44 and includes a control valve for controlling the introduction of pressurized fluid to inlet 42 in response data obtained by probe 52 regarding substance concentration on filter 30 within filter apparatus 20.

It has been found that rotation of spay tube 40 at relatively high revolutions per minute causes rotation of the fluid within filter 30 thereby generating a voraxial centrifugal effect on the cleaned fluid within cylindrical filter 30. The combined effect of a pressurized fluid spray being discharged from spray tube 40 and high speed rotation of spray tube 40 further results in active agitation of the walls of the filter with the pressurized spray blowing fluid and substances radially away from the filter wall while voraxial action generates an area of low pressure within cylindrical filter 30 thereby drawing fluid entering filter inlet 22 toward filter 30.

Figure 15:
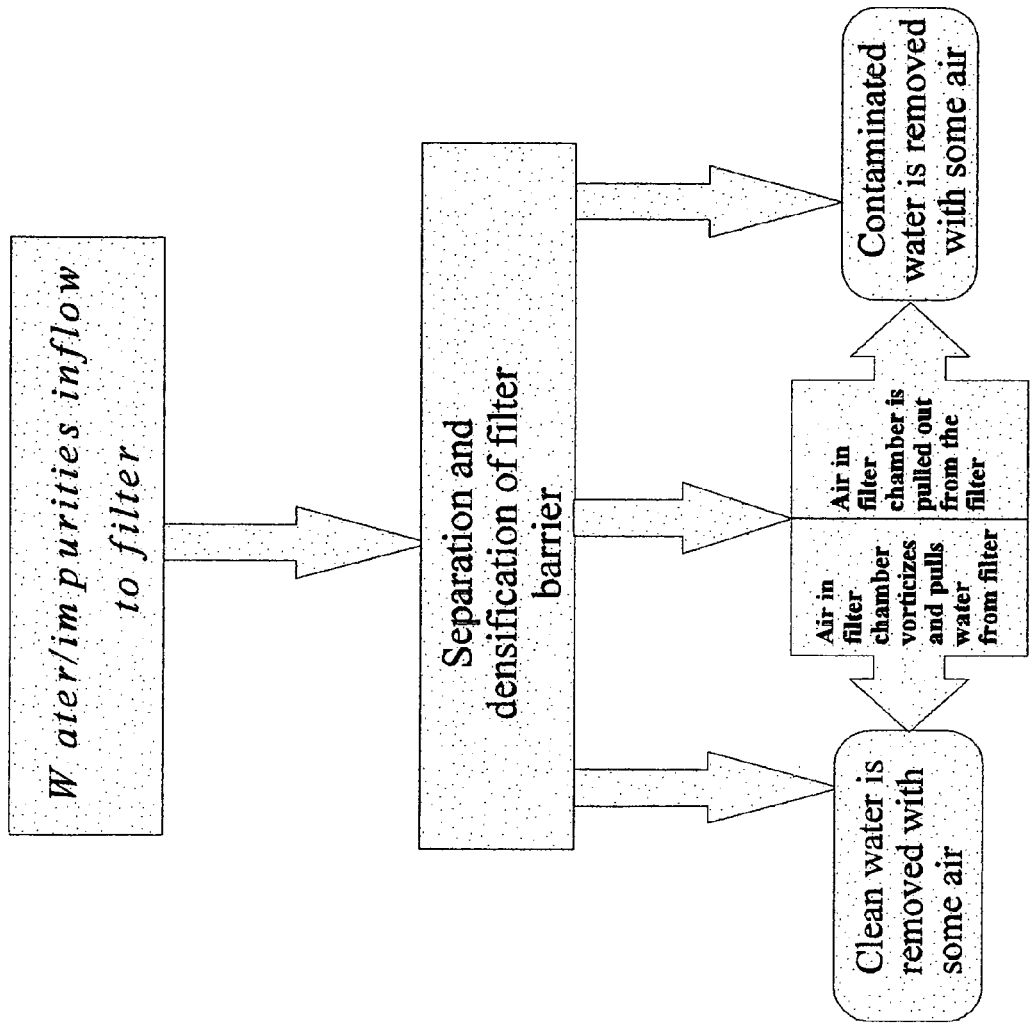
FIG. 15 is a block diagram illustrating fluid flow.
Figure 16:
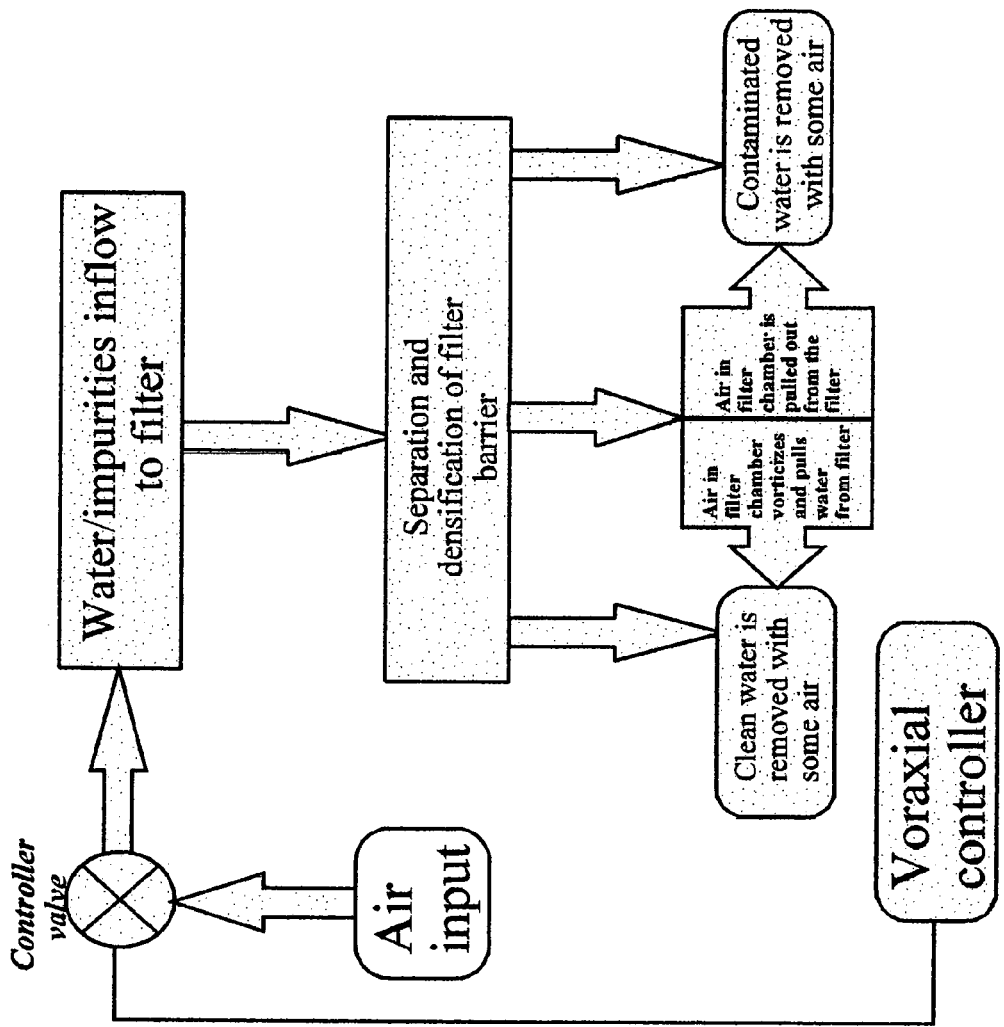
FIG. 16 is a schematic and block diagram illustrating fluid flow and control.
Figure 17:
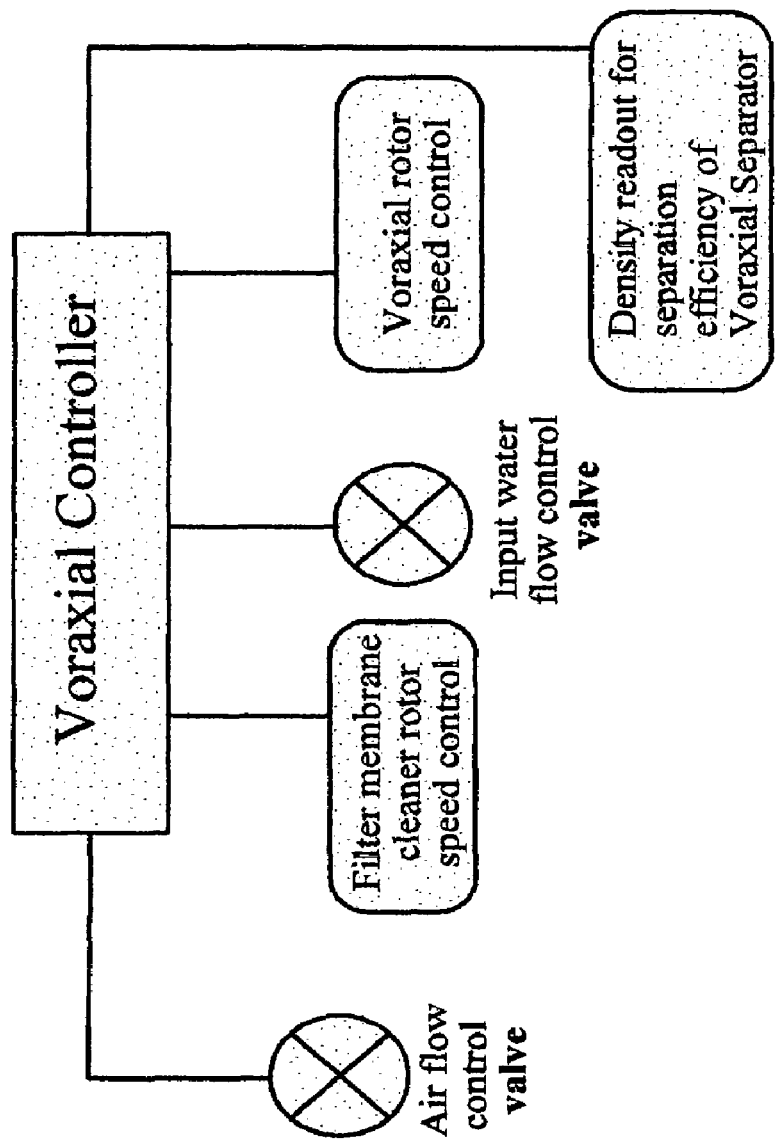
FIG. 17 is a control schematic.

FIG. 15 is a block diagram illustrating an application wherein water and impurities enter filter 20 via inlet 22, and pressurized fluid (i.e. pressurized air) creates a vortex within cylindrical filter 30 such that filtered water and air are removed from outlet 24, while contaminated water and some air are removed from outlet 26. FIG. 16 is a block diagram and control schematic wherein sensing and voraxial control apparatus 50 controls the introduction of pressurized air for the filter cleaning process via a control valve.

The auxiliary filtration system disclosed herein is preferably used in conjunction with a primary voraxial separation system, in upstream, intermediate, or downstream configurations to provide more efficient separation of flowable composite media. As should be apparent, however, the auxiliary filtration system may be used as a primary self-cleaning filtering system for a wide variety of applications.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What we claimed is:

1. A system for separating flowable composite media into its components, said system comprising:
   pump means delivering a flowing stream of composite media, said composite media including at least a first component medium and a second component medium;
   a separation tube through which the flowing stream of composite media is passed;

means for spinning the stream of flowable composite media about the axis of said separation tube at sufficient rotational speed that centrifugal force within the stream causes the components to separate into component radial layers;

extraction conduit means for selectively extracting one or more of the radial layers from said separation tube; and at least one auxiliary filter in direct fluid communication with said separation tube by a further conduit extending from an outlet of said separation tube, said at least one auxiliary filter having a generally cylindrical housing with a cylindrical housing longitudinal axis and two opposing housing longitudinal ends containing a generally cylindrical filter defining a filter interior, a filter inward surface and a filter outward surface, said cylindrical housing having an inlet disposed upstream of said filter and opening into said cylindrical housing outside said cylindrical filter, a filtered outlet disposed downstream of said filter and opening out of said cylindrical housing from said filter interior, and a bypass outlet opening out of one of said housing longitudinal ends along said housing longitudinal axis, such that the flowing media enters said cylindrical housing outside said cylindrical filter, passes through said cylindrical filter and exits said cylindrical housing from within said filter interior and filtered material collects on the filter outward surface, said auxiliary filter including a rotatable self-cleaning means for cleaning said auxiliary filter, said rotatable self cleaning means including an elongate spray tube disposed within said cylindrical filter, said spray tube in fluid communication with a pressurized fluid source and having a plurality of apertures oriented so as to direct pressurized fluid from said fluid source onto the filter inward surface such that the fluid passes through said filter and dislodges material collected on the filter outward surface which flows between the filter and the housing and directly exits said cylindrical housing through said bypass outlet.

2. A system for separating flowable composite media according to claim 1, further comprising:

monitoring and automatic feed back means for measuring the concentration of component medium content of the composite media on said cylindrical filter and for activating and controlling rotational speed of said spray tube and fluid communication between said spray tube and said pressurized fluid source;

said monitoring and automatic feed back means including probe means extending into said at least one auxiliary filter for gathering data concerning the concentration of medium on said cylindrical filter, and an analyzer connected to said probe means for receiving and analyzing said data and for automatically controlling the rotational speed of said spray tube and fluid communication between said spray tube and said pressurized fluid source.

\* \* \* \* \*